(12) United States Patent
Broadbent (10) Patent No.: US 11,867,550 B2
(45) Date of Patent: Jan. 9, 2024

(54) APPARATUS AND METHOD FOR SENSING WATER LEVEL

(71) Applicant: MANITOWOC FOODSERVICE COMPANIES, LLC, New Port Richey, FL (US)

(72) Inventor: John A. Broadbent, Tampa, FL (US)

(73) Assignee: MANITOWOC FOODSERVICE COMPANIES, LLC, New Port Richey, FL (US)

( * ) Notice: Subject to any disclaimer, the term of this patent is extended or adjusted under 35 U.S.C. 154(b) by 0 days.

(21) Appl. No.: 17/836,103

(22) Filed: Jun. 9, 2022

(65) Prior Publication Data

US 2022/0397440 A1 Dec. 15, 2022

Related U.S. Application Data

(60) Provisional application No. 63/208,859, filed on Jun. 9, 2021.

(51) Int. Cl.
*G01F 23/18* (2006.01)
*G01F 25/20* (2022.01)

(52) U.S. Cl.
CPC .............. *G01F 23/18* (2013.01); *G01F 25/20* (2022.01)

(58) Field of Classification Search
CPC ........ G01F 23/14; G01F 23/18; G01F 23/185; G01F 25/20; G01F 25/22; G01F 25/24; F25C 2700/04
See application file for complete search history.

(56) References Cited

U.S. PATENT DOCUMENTS

| 9,003,824 B2 | 4/2015 | Almblad et al. |
| 9,644,879 B2 | 5/2017 | Broadbent |
| 2008/0178614 A1* | 7/2008 | Broadbent ................ F25C 5/10 |
| | | 62/340 |

(Continued)

OTHER PUBLICATIONS

International Search Report dated Sep. 2, 2022 for PCT Appl. No. PCT/US2022/032759.

(Continued)

*Primary Examiner* — Herbert K Roberts
(74) *Attorney, Agent, or Firm* — Ohlandt, Greeley and Perle, LLP (57) ABSTRACT

An ice maker includes a refrigeration system, a water system, and a control system. The control system includes an air fitting disposed above the sump of the water system, a pneumatic tube, and a controller including a processor and an air pressure sensor. The air fitting defines a chamber in which air may be trapped and includes one or more openings through which water in the sump is in fluid communication with the air in the chamber. The pneumatic tube is in fluid communication with the air pressure sensor and the air fitting. The air pressure sensor is adapted to sense a pressure corresponding to a sump water level. The controller is adapted to control the operation of the refrigeration system and the operation of the water system based upon the sump water level. To avoid errors in water level measurements due to temperature changes, the system uses the pressure sensor data's noise level to detect when the water level reaches the bottom of the air fitting.

11 Claims, 7 Drawing Sheets

(56) References Cited

U.S. PATENT DOCUMENTS

| | | | |
|---|---|---|---|
| 2008/0271527 A1* | 11/2008 | Hewitt | G01F 23/164 |
| | | | 73/299 |
| 2010/0162812 A1* | 7/2010 | Parkinson | G01F 23/185 |
| | | | 73/299 |
| 2012/0125025 A1 | 5/2012 | Ishizeki et al. | |
| 2014/0208781 A1* | 7/2014 | Broadbent | F25C 5/185 |
| | | | 62/66 |

OTHER PUBLICATIONS

Written Opinion dated Sep. 2, 2022 for PCT Appl. No. PCT/US2022/032759.

* cited by examiner

APPARATUS AND METHOD FOR SENSING WATER LEVEL

CROSS-REFERENCE TO RELATED APPLICATION

The present application claims the benefit under 35 U.S.C. § 119 of U.S. Provisional Patent Application Ser. No. 63/208,859, filed on Jun. 9, 2021, which is herein incorporated by reference.

FIELD OF THE DISCLOSURE

This disclosure relates generally to automatic ice making machines and, more particularly, to ice making machines comprising systems and employing methods which permit for more reliably and controllably determining when to initiate a harvest cycle and when to terminate the fill cycle based on water level.

BACKGROUND OF THE DISCLOSURE

Ice making machines, or ice makers, that employ freeze plates which comprise lattice-type cube molds and have gravity water flow and ice harvest are known. Such machines are desirable for commercial installations such as restaurants, bars, motels, and various beverage retailers having a high and continuous demand for fresh ice.

In these ice makers, water is supplied at the top of a freeze plate which directs the water in a tortuous path toward a water pump. A portion of the supplied water collects on the freeze plate, freezes into ice and is identified as sufficiently frozen by suitable methods or devices whereupon the freeze plate is defrosted such that the ice is slightly melted and discharged therefrom into a bin. Typically, these ice machines can be classified according to the type of ice they make. One such type is a grid style ice maker which makes generally square ice cubes that form within individual grids of the freeze plate which then form into a continuous sheet of ice cubes as the thickness of the ice increases beyond that of the freeze plate. After harvesting, the sheet of ice cubes will break into individual cubes as they fall into the bin. Another type of ice maker is an individual ice cube maker which makes ice cubes which do not form into a continuous sheet of ice cubes. Therefore, upon harvest individual ice cubes fall from the freeze plate and into the bin. Various embodiments of the disclosure can be adapted to either type of ice maker, and to others not identified, without departing from the scope of the disclosure. Accordingly, the freeze plate as described herein encompasses any number of types of molds for creating a continuous sheet of ice cubes, individual ice cubes, and/or cubes of different shapes. Controls are provided to control the operation of the ice maker to ensure a constant supply of ice.

It is important to determine when the ice has formed to a sufficient thickness such that it can be harvested. Harvesting too early yields small cubes of ice that may not harvest properly. Harvesting too late yields large chunks of ice that do not easily separate into smaller pieces or individual cubes and may also not harvest properly. Typically, an ice thickness sensor detects the thickness of the ice forming on the freeze plate. When a desired thickness is reached, the sensor signals the ice maker to terminate the freeze cycle and begin a harvest cycle. In the harvest cycle the refrigerant flow path is changed so that the freeze plate is heated to melt the formed ice cubes away from the freeze plate.

Different devices have been used over the years to determine the ice thickness and thus the appropriate time to harvest. Many commercial cube ice machines sold in the United States utilize a hinged sensor located in front of the freeze plate and evaporator to detect the ice thickness in order to initiate harvesting of the ice cubes at the appropriate time. The hinged sensor may use an electrical continuity sensor or an acoustic sensor to directly measure the ice thickness. The hinged sensor approach has the advantage of directly measuring ice thickness as opposed to inferring the thickness from other measurements. This type of system is very common because it is relatively easy to mechanically adjust and provides a relatively accurate and consistent ice thickness measurement.

However, this approach has several drawbacks. Because the sensor is in the food zone, it must comply with NSF rules for potable water. Thus, the sensor must be made of suitable material and have suitable geometry for use in the food zone of an ice machine, as defined by NSF. Also, the sensor is exposed to the flowing water, so care must be taken to ensure that it will not be adversely affected by the water itself or the scale that may be left on the sensor by the water.

Because the sensor is placed in front of the evaporator assembly and the freeze plate, it must move out of the way when the ice is harvested so that the sensor does not obstruct the falling ice. Thus, the sensor is a moving part which could fail by not moving correctly. The thickness of the ice sensed is a function of how far the sensor is from the ice. Thus, the sensor must be in exactly the right position or it will not work as desired. This distance is controlled by a set screw which must be manually adjusted and thus could be adjusted incorrectly or change over time. Additionally, the ice thickness cannot be adjusted electronically because the ice thickness is controlled by the position of the set screw or other mechanical means. Consequently, the ice thickness can only be adjusted mechanically.

In some cases, the hinged sensor approach uses electrical conductivity whereby an electrical probe on the sensor is positioned closely adjacent the surface of the evaporator and freeze plate. When ice builds to a desired thickness the electrical probe comes in contact with the flow of water completing an electrical circuit which can trigger the harvest cycle. This method is subject to fouling of the sensor with minerals or other contaminants that would adhere to the sensor and prevent the electrical conductivity measurement necessary to signal ice thickness. Additionally, the sensors must be protected from contaminants that would provide an alternate conductivity path. This sensor must also be designed so that the sensor will detect the water even if the water has extremely low conductivity, as is the case with water filtered using reverse osmosis ("RO water") or deionized "DI water".

Therefore, there is a need in the art for an ice maker comprising an apparatus and incorporating a method for accurately detecting ice thickness in an ice maker where: the ice thickness sensor is not located in the food zone, the ice thickness sensor is not subjected to the impurities of the water supply, the ice thickness sensor is not a moving part that needs to be moved clear of falling ice during the ice harvest cycle, the ice thickness sensor is not required to be precisely mechanically located and adjusted, and the ice thickness sensor is electronically adjustable. Additionally, there is a need in the art for an ice maker comprising an apparatus and incorporating a method for detecting water level in the sump which is not affected by changes in the air temperature surrounding the water level sensing device.

SUMMARY OF THE DISCLOSURE

Briefly, therefore, one embodiment of the disclosure is directed to an ice maker for forming ice, the ice maker comprising: an evaporator; a water pump for supplying water to a surface of the evaporator, so that water on the surface of the evaporator forms ice; a sump below the freeze plate to hold water that passes over the evaporator surface; an air fitting in the sump, the air fitting defining a chamber, wherein air is in the chamber, wherein the air fitting comprises one or more openings through which water in the sump is in fluid communication with the air in the chamber; a pneumatic tube having a proximal end and a distal end, wherein the air inside the distal end is in fluid communication with the chamber of the air fitting; and a controller comprising a processor and an air pressure sensor, wherein the air inside the proximal end of the pneumatic tube is in fluid communication with the air pressure sensor. The air pressure sensor measures an air pressure from the air chamber of the air fitting, and the air pressure has a noise level of data associated therewith. The air pressure corresponds to a water level in the sump. When the water level is below the air fitting, the noise level of the data associated with the air pressure is lower than the noise level of data associated with the air pressure when the water level is higher than the bottom of the air fitting.

The disclosure also provides a method of controlling the ice maker of the preceding paragraph. The method comprises the steps of sensing the noise level of data associated with the air pressure measured by the air pressure sensor and using that data to determine if the water level is above or below the bottom of the air fitting. A higher noise level corresponds to the water level being above the bottom of the air fitting and a lower noise level corresponds the water level being below the bottom of the air fitting.

The electrical signal provided by the air pressure sensor gives a measure of the pressure of the air in the pneumatic tube and the air fitting. This signal is proportional to the level of water in the sump. The voltage amplitude of this signal indicates the air pressure, but the signal itself is very noisy. To get a somewhat smooth signal, the controller reading data from the air pressure sensor must filter or average this data to minimize this noise. The magnitude of this noise (the highest amplitude voltage minus the lowest amplitude voltage) is significantly lower when the pressure sensor is measuring the ambient air pressure, that is, when the air in the air fitting isn't trapped by water in the sump. This difference in data noise level can be utilized by the system to determine when the water level is just slightly (e.g., 0.001") below the bottom of the air fitting. When the water level is just below the bottom of the air fitting, the data noise level will be at the lower level. When the water level is at or above the bottom of the air fitting, the data noise will be at the higher level. The data noise level when the water level is at or above the bottom of the air fitting can be higher than the data noise level when the water level is just below the bottom of the air fitting by a factor of five to 100, or any subranges therebetween, or a factor of 10 to 100, or any subranges therebetween.

During ice making, when the machine is converting water into ice and the water level in the sump is falling, the system monitors the water level sensor for what noise level is being detected. When the noise level goes from its higher level (indicating the water is above the bottom of the air fitting) to the lower level, the water level is at a known position—exactly at the bottom of the air fitting. The change in noise level from when the water is above the bottom of the fitting to when it is below the bottom of the fitting is dramatic. When the bottom of the air fitting is above the water level and the fitting is exposed to the ambient air pressure, the noise level measured is a factor of 10 less than when the air fitting is below the water level. Using this change in noise level to detect when the water level drops below the air fitting allows the system to know the exact water level regardless of any temperature changes in the air in the pneumatic tube and the air fitting since it is not using air pressure per se to detect water level at this point. This is important since the temperature of the air in the pneumatic tube can change dramatically during the freeze cycle, thus potentially skewing the pressure reading. For example, the air in the tube can go from ambient temperature at the beginning of the cycle (e.g., 70 deg. F) to very close to freezing (~40 deg. F) at the end of the cycle. Because air contracts as it cools, this change in temperature affects the pressure in the pneumatic tube and will leads to an incorrect water level measurement.

When the ice has been harvested and the sump is refilling, the position of the water can be determined using the air pressure indicated by the sensor. The filling can be stopped when the system detects that the water level has reached the "full" level. The temperature of the air in the air fitting and pneumatic tube is much less critical during filling since filling happens fast, e.g., less than one minute. By contrast, an ice making cycle can take 20 minutes or more. Filling happens fast enough that the air temperature in the air fitting and pneumatic tube can't change enough to significantly affect the water level height measurement.

The method of controlling the ice maker comprises using the noise level of the data from the pressure sensor to determine the sump's low water level so as to initiate the harvest cycle when the water level drops below the bottom of the air fitting. This allows the low water level trigger point to be at the exact same level every cycle, regardless of the temperature of the air in the pneumatic tube.

BRIEF DESCRIPTION OF THE FIGURES

These and other features, aspects and advantages of the disclosure will become more fully apparent from the following detailed description, appended claims, and accompanying drawings, wherein the drawings illustrate features in accordance with exemplary embodiments of the disclosure, and wherein:

DETAILED DESCRIPTION OF THE DISCLOSURE

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Embodiments of the ice maker described herein comprise a controller and an air pressure sensor which permit the detection of the thickness of the formation of ice on a freeze plate in an ice maker. Additionally, the controller and air pressure sensor allow the controller to determine the amount of water that has been converted to ice and determine the appropriate time at which to initiate an ice harvest cycle. By monitoring the water level throughout the ice making cycle, the controller can also determine and control the thickness of the ice cubes produced, the amount of remaining ice making water purged each cycle, when to open and close the inlet water valve to fill to the proper levels and whether or not the water pump or other components of the ice maker are functioning properly.

Figure 1:
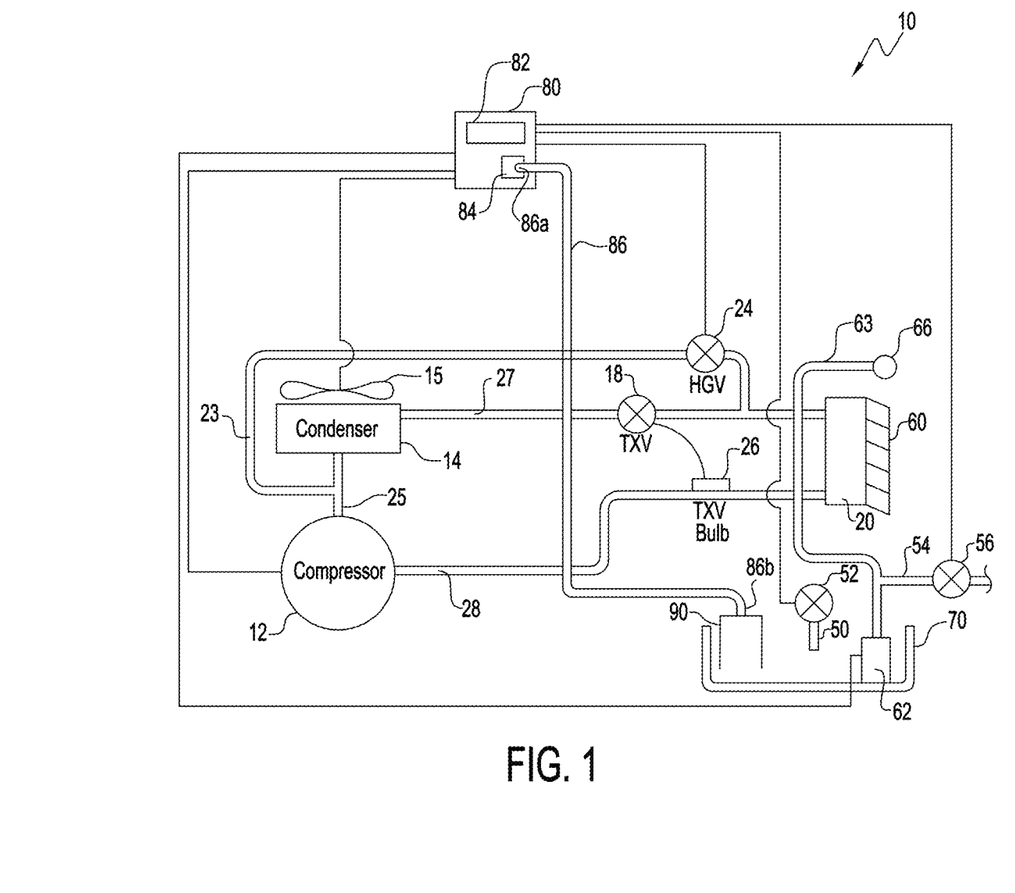
FIG. 1 is a schematic drawing of an ice maker having various components according to one embodiment of the disclosure.
Figure 4:
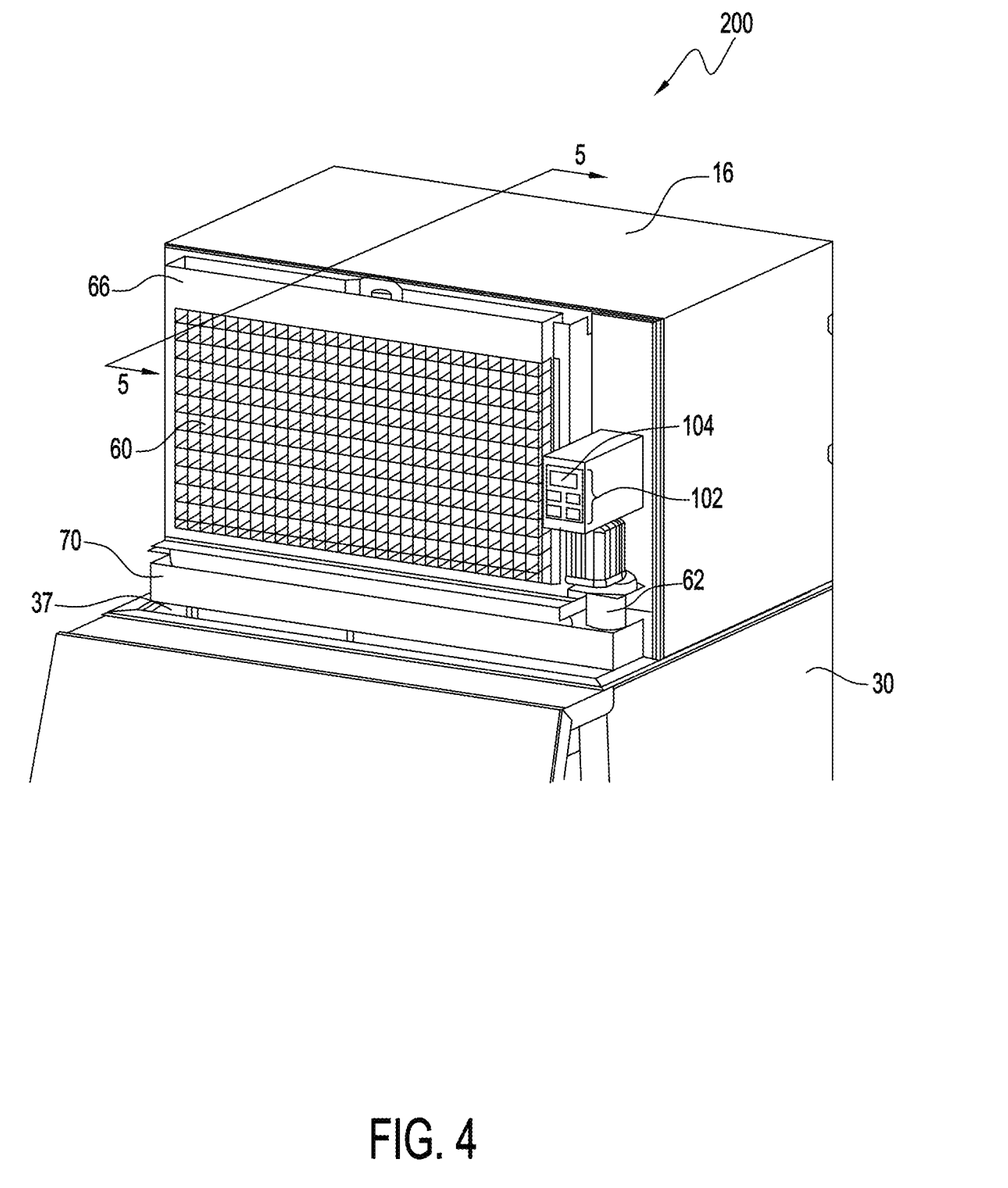
FIG. 4 is a right perspective view of an ice maker assembly with an ice maker disposed within a cabinet wherein the cabinet is disposed on an ice storage bin assembly according to one embodiment of the disclosure.

FIG. 1 illustrates certain principal components of one embodiment of ice maker 10 having a refrigeration system and ice making or water system. The refrigeration system of ice maker 10 may include compressor 12, condenser 14 for condensing compressed refrigerant vapor discharged from the compressor 12, thermal expansion device 18 for lowering the temperature and pressure of the refrigerant, evaporator assembly 20, freeze plate 60 thermally coupled to evaporator assembly 20, and hot gas valve 24. In certain embodiments, freeze plate 60 may contain a large number of pockets (usually in the form of a grid of cells) on its surface where water flowing over the surface can collect (see FIG. 4).

Thermal expansion device 18 may include, but is not limited to, a capillary tube, a thermostatic expansion valve or an electronic expansion valve. In certain embodiments, where thermal expansion device 18 is a thermostatic expansion valve or an electronic expansion valve, ice maker 10 may also include a temperature sensing bulb 26 placed at the outlet of the evaporator assembly 20 to control thermal expansion device 18. In other embodiments, where thermal expansion device 18 is an electronic expansion valve, ice maker 10 may also include a pressure sensor (not shown) placed at the outlet of the evaporator assembly 20 to control thermal expansion device 18 as is known in the art. In certain embodiments that utilize a gaseous cooling medium (e.g., air) to provide condenser cooling, a condenser fan 15 may be positioned to blow the gaseous cooling medium across condenser 14. As described more fully elsewhere herein, a form of refrigerant cycles through these components via a lines 23, 25, 27, 28.

The water system of ice maker 10 may include water pump 62, water line 63, water distribution manifold or tube 66, and sump 70 located below freeze plate 60 adapted to hold water. During operation of ice maker 10, as water is pumped from sump 70 by water pump 62 through water line 63 and out of distributor manifold or tube 66, the water impinges on freeze plate 60, flows over the pockets of freeze plate 60 and freezes into ice. Sump 70 may be positioned below freeze plate 60 to catch the water coming off of freeze plate 60 such that the water may be recirculated by water pump 62 (see FIGS. 4 and 5). In addition, hot gas valve 24 may be used to direct warm refrigerant from compressor 12 directly to evaporator assembly 20 to remove or harvest ice cubes from freeze plate 60 when the ice has reached the desired thickness.

Ice maker 10 may further include water supply line 50 and water inlet valve 52 disposed thereon for filling sump 70 with water from a water source (not shown), wherein some or all of the supplied water may be frozen into ice. Ice maker 10 may further include purge line 54 and purge valve 56 disposed thereon. Water and/or any contaminants remaining in sump 70 after ice has been formed may be purged via purge line 54 and purge valve 56. In various embodiments, purge line 54 may be in fluid communication with water line 63. Accordingly, water in sump 70 may be purged from sump 70 by opening purge valve 56 when water pump 62 is running.

Figure 5:
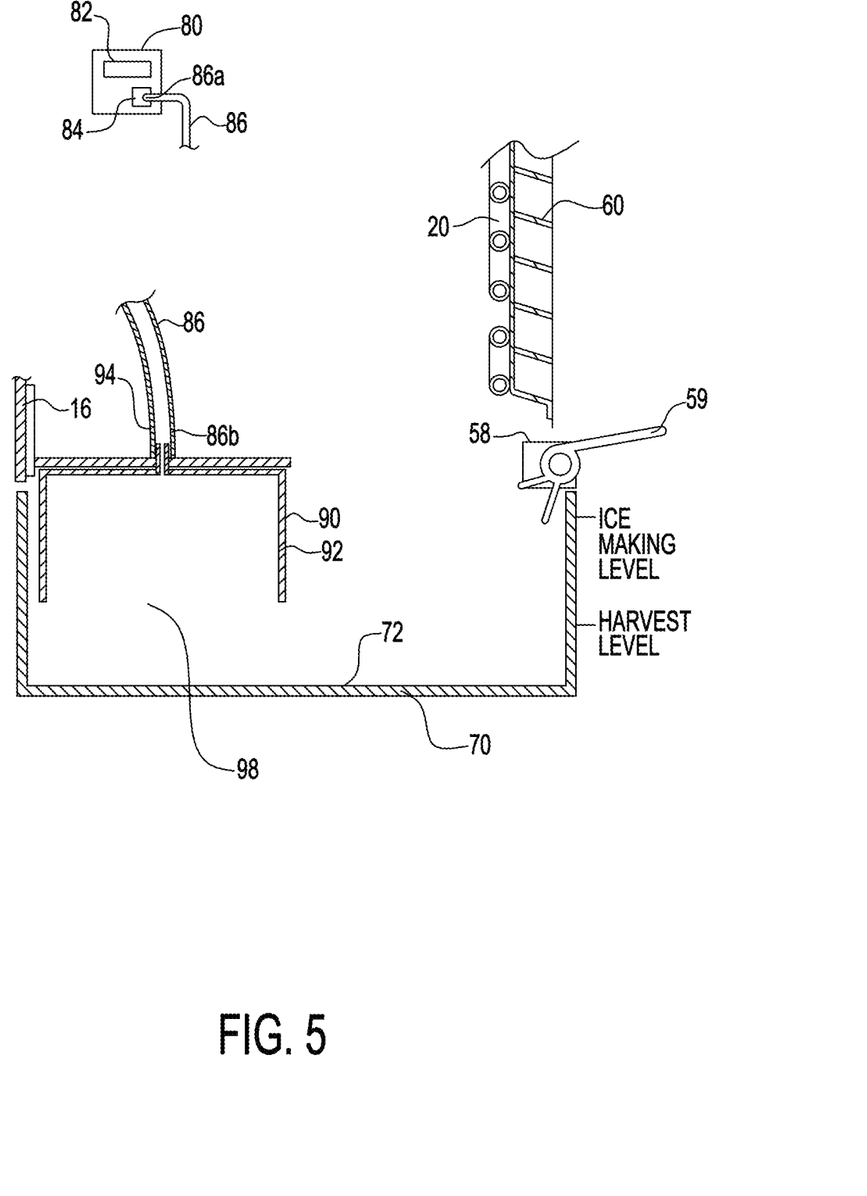
FIG. 5 is a section view of an ice maker according to one embodiment of the disclosure.

As illustrated in FIG. 5, ice maker 10 may also include curtain switch 58 which may sense when door 59 is opened by ice as it is harvested from freeze plate 60. In certain embodiments, for example, as illustrated in FIG. 5, curtain switch 58 may sense when door 59 is open or closed by sensing rotation of door 59. In other embodiments, for example, curtain switch 58 may sense when door 59 is open or closed by whether door 59 contacts or is in proximity to curtain switch 58. It will be understood that any type of harvest sensor which can sense whether door 59 is open or closed may be used without departing from the scope of the disclosure. Ice maker 10 may have other conventional components not described herein without departing from the scope of the disclosure.

Returning to FIG. 1, ice maker 10 may also include a control and water level measurement system having air fitting 90 disposed just above the bottom of sump 70 (0.1" to 0.5" above, for example), pneumatic tube 86 in fluid communication with air fitting 90, and controller 80. Controller 80 may be located remote from evaporator assembly 20 and sump 70. Controller 80 may include a processor 82 for controlling the operation of ice maker 10. Controller 80 may also include, or be coupled to, air pressure sensor 84, which may be used to detect the water pressure proximate bottom 72 (see FIG. 5) of sump 70 wherein the water pressure proximate bottom 72 of sump 70 can be correlated to the water level in sump 70. The water level in sump 70 may be correlated to the thickness of ice on freeze plate 60. Using the output from air pressure sensor 84, processor 82 can determine the water level in sump 70 throughout the cooling cycle. The use of air pressure sensor 84 also allows processor 82 to determine the appropriate time at which to initiate an ice harvest cycle, control the fill and purge functions. Controller 80 may be accessed by a user via a PC or application.

In certain embodiments, air pressure sensor 84 may include a piezoresistive transducer comprising a monolithic silicon pressure sensor. The transducer may provide an analog signal to controller 80 with analog to digital (A/D) inputs. Air pressure sensor 84 may use a strain gauge to provide an output signal that is proportional to the applied pressure of water within sump 70. In certain embodiments, air pressure sensor 84 may be a low-cost, high-reliability air pressure transducer, such as part number MPXV5004 from NXP Semiconductor N.V.

Processor 82 of controller 80 may include a processor-readable medium storing code representing instructions to cause processor 82 to perform a process. Processor 82 may be, for example, a commercially available microprocessor, an application-specific integrated circuit (ASIC) or a combination of ASICs, which are designed to achieve one or more specific functions, or enable one or more specific devices or applications. In yet another embodiment, controller 80 may be an analog or digital circuit, or a combination of multiple circuits. Controller 80 may also include one or more memory components (not shown) for storing data in a form retrievable by controller 80. Controller 80 can store data in or retrieve data from the one or more memory components. Controller 80 may also include a timer for measuring elapsed time. The timer may be implemented via hardware and/or software on or in controller 80 and/or processor 82 in any manner known in the art without departing from the scope of the disclosure.

Figure 2:
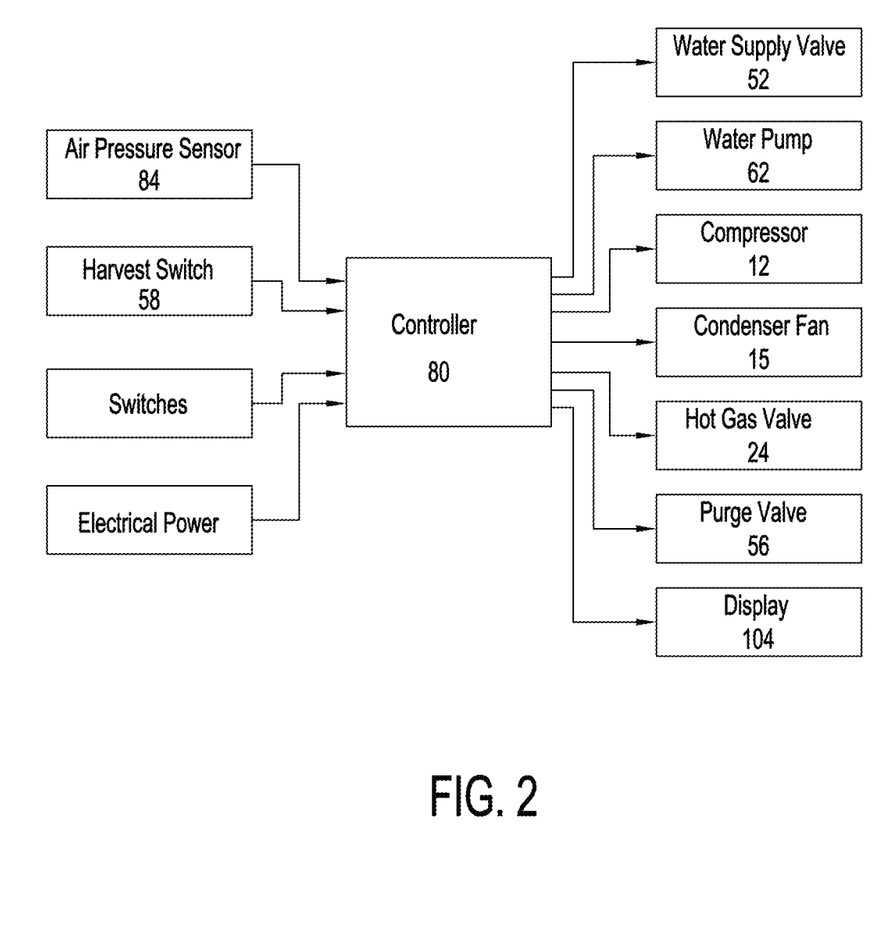
FIG. 2 is a schematic drawing of a controller for controlling the operation of the various components of an ice maker.

In various embodiments, in reference to FIGS. 1 and 2, controller 80 may also comprise input/output (I/O) components (not shown) to communicate with and/or control the various components of ice maker 10. In certain embodiments, for example controller 80 may receive inputs from an air pressure sensor 84, a curtain switch 58 (see FIG. 5), an electrical power source (not shown), user control panel 102 (see FIG. 4), and/or a variety of sensors and/or switches including, but not limited to, pressure transducers, temperature sensors, acoustic sensors, etc. In various embodiments, based on those inputs for example, controller 80 may be able to control compressor 12, condenser fan 15, water pump 62, water inlet valve 52, purge valve 56, hot gas valve 24, and/or thermal expansion device 18. Controller 80 may also be able to control display 104 on user control panel 102 (see FIG. 4). Display 104 may be able to display messages, including error or failure messages, as reported and/or indicated by controller 80 to display 104. Display 104 may be any type and/or of display including, but not limited to, an LCD screen, one or more LEDs, etc. without departing from the scope of the disclosure. In certain embodiments, ice maker 10 may include an alarm (not shown) which can provide an audible alert that controller 80 has detected a failure mode. The alarm may include, but is not limited to, a speaker, a buzzer, a chime, a bell, and/or some other device capable of making a human-audible and/or non-human-audible sound. In certain embodiments, the alarm of ice maker 10 may emit a non-human-audible sound which may be detected by a telephone, smartphone, tablet computer, portable computer, and/or any portable device for diagnosing the failure mode. Display 104 and/or alarm may permit a person to determine if ice maker 10 is working or if a failure mode has been detected. Accordingly, in various embodiments, ice maker 10 can indicate that a failure mode has been detected.

According to one or more embodiments of the disclosure, the I/O component can include a variety of suitable communication interfaces. For example, the I/O component can include wired connections, such as standard serial ports, parallel ports, universal serial bus (USB) ports, S-video ports, local area network (LAN) ports, and small computer system interface (SCSI) ports. Additionally, the I/O component may include, for example, wireless connections, such as infrared ports, optical ports, Bluetooth® wireless ports, wireless LAN ports, or the like. In certain embodiments, controller 80 may be connected to a network (not shown), which may be any form of interconnecting network including an intranet, such as a local or wide area network, or an extranet, such as the World Wide Web or the Internet. The network can be physically implemented on a wireless or wired network, on leased or dedicated lines, including a virtual private network (VPN).

Referring now to FIG. 5, an embodiment of air fitting 90 and pneumatic tube of the control system is described in detail. In certain embodiments, air pressure sensor 84 may be connected to sump 70 by pneumatic tube 86 having a proximal end 86a and a distal end 86b. Proximal end 86a of pneumatic tube 86 is connected to air pressure sensor 84 and distal end 86b of pneumatic tube 86 is connected to and in fluid communication with air fitting 90. Air fitting 90 may be positioned just above the bottom of sump 70 which is in fluid communication with the water proximate bottom 72 of sump 70. The top and sides of air fitting 90 define a chamber 92 in which air may be trapped. One or more openings 98 in the bottom of air fitting 90 allow the water proximate bottom 72 of sump 70 to be in fluid communication with the air in chamber 92 of air fitting 90. As the water level in sump 70 increases, the pressure of the water proximate bottom 72 of sump 70 is communicated to the air in chamber 92 through the one or more openings 98 of air fitting 90. The air pressure inside chamber 92 increases and this pressure increase is communicated via air through pneumatic tube 86 to air pressure sensor 84. Controller 80 can thus determine the water level in sump 70. Additionally, as the water level in sump 70 decreases, the pressure in chamber 92 also decreases. This pressure decrease is communicated via air through pneumatic tube 86 to air pressure sensor 84. Controller 80 can thus determine the water level in the sump.

The electrical signal provided by the air pressure sensor 84 gives a measure of the pressure of the air in the pneumatic tube 86 and the air fitting 90. This signal is proportional to the level of water in sump 70. The voltage amplitude of this signal indicates the air pressure, but the signal itself is very noisy. To get a somewhat smooth signal, controller 80 reading data from the air pressure sensor 84 must filter or average this data to minimize the noise. The magnitude of this noise (the highest amplitude voltage minus the lowest amplitude voltage) is significantly lower when the pressure sensor 84 is measuring the ambient air pressure, that is, when the air in air fitting 90 isn't trapped by water in the sump 70. This difference in data noise level can be utilized by the system to determine when the water level is just slightly (e.g., 0.001") below the bottom of the air fitting 90. When the water level is just below the bottom of the air fitting 90, the data noise level will be at the lower level. When the water level is at or above the bottom of the air fitting 90, the data noise will be at the higher level. The data noise level when the water level is at or above the bottom of the air fitting can be higher than the data noise level when the water level is just below the bottom of the air fitting by a factor of five to 100, or any subranges therebetween, or a factor of 10 to 100, or any subranges therebetween.

During ice making, when ice machine 10 is converting water into ice and the water level in sump 70 is falling, controller 80 monitors the data from pressure sensor 84 for what noise level is present. When the noise level goes from its higher level (indicating the water is above the bottom of the air fitting 90) to the lower level, the water level is at a known position—exactly at the bottom of the air fitting 90. Using this change in noise level to detect a known water level allows the system to know the exact water level regardless of any temperature changes in the air in the pneumatic tube 86 and the air fitting 90 since it is not using the pressure of the air to detect water level at this point.

Likewise, since the controller is not using the value of the air pressure to determine water level at this point (rather it is using the noise level of that data), the controller is not affected by the calibration of pressure sensor 84 or any drift that the sensor may be subject to.

By placing air pressure sensor 84 in remotely located controller 80, air pressure sensor 84 is not located in the food zone. Due to such placement, air pressure sensor 84 may not be affected by the minerals or scale that the supply water can leave behind because air pressure sensor 84 does not come into contact with water. Additionally, because air pressure sensor 84 does not come into contact with water it may not be affected by the electrical properties of water and can therefore be used to determine ice thickness for de-ionized supply water or a water supply with a heavy mineral content. Also, in certain embodiments, air pressure sensor 84 has no moving parts and therefore may not be susceptible to inconsistencies in its placement within ice maker 10 or changes over time as ice maker 10 ages.

In certain embodiments, the position of air pressure sensor 84 and the position of air fitting 90 are not adjustable. Accordingly, in various embodiments, the ice thickness, the amount of water filled into sump 70, and the amount of water purged from sump 70 each cycle can be measured, controlled, and adjusted electronically. With the methods and devices of the present disclosure, the ice thickness can be accurately measured to within 1% error of the thickness of the ice.

The amount of water used to make each batch of ice is the difference in water from when the sump is full to when the harvest starts. That amount of liquid water is converted into ice, so it is no longer in circulation, and the water level drops accordingly.

Sump 70 is full when sensor 84 detects that the water level is equal to the "full" level and consequently closes inlet valve 52. The "full" level will correspond to how much ice is to be made plus some additional water. The water in sump 70 is at the harvest level when the water level drops below the bottom of air fitting 90. Since air fitting 90 doesn't move, this harvest level (i.e. when the water in sump 70 is at its lowest level during the ice making process) cannot be adjusted. However, since the "full" level of water is just a number in the software, it can be adjusted by setting that software parameter in the memory of controller 80. This is what is meant by setting or adjusting the amount of water in sump 70 electronically. Setting that parameter could be done a number of ways: pre-programming it into the code, providing a user interface that allows the user to adjust it, allowing a user to adjust it remotely (e.g., from his phone), creating a mechanical interface to allow adjustment (e.g., a potentiometer setting), etc.

It is important to purge the ice making water regularly to keep the ice cubes clear and the machine running properly. Without a purge, the ice will typically get cloudy and the surfaces inside the ice maker will accumulate scale faster than normal. Typically the amount of water purged is about ⅓ of the total amount of water used. For example, if it is desired to make a pound of ice, the purge would be approximately 0.5 pounds of water.

However, the more water that is purged, the more energy the machine will use, since the water purged has been cooled by the ice machine. Accordingly, some users will want more purge (if their water has a lot of scale in it) or less purge (if they have good water quality and want to save energy).

The purge occurs after harvest starts, and thus after the water level has dropped below air fitting 90. Because of this the level sensor 84 cannot directly tell how much water is being purged. The present disclosure contemplates several ways to determine how much water is being purged, and ways to adjust it. Purge valve 56 open for a set amount of time, which can be adjusted to be longer or shorter. The purge can thus be adjusted by controlling that duration. Purge valve 56 can also be open for a set time, but vary how often it occurs—e.g., it can purge every cycle, every other cycle, every third cycle, etc. The rate of drop in the water level when purge valve 56 is on can be measured and the amount of time that purge valve 56 is open can be set (or adjusted electronically) to achieve the desired purge quantity. For example, there could be a start-up sequence that opens purge valve 56 for five seconds and the sensor 84 could measure how much the level dropped during that time. That information could then be used later to determine how long to open the purge valve 56 each time a purge is completed.

Embodiments of this type of control and water level measurement system have additional advantages. First, as stated previously, a low-cost, high-reliability pressure transducer may be used in ice maker 10. Second, as described above, the level of noise in the data from air pressure sensor 84 can be used to determine when the water level has reached the bottom of air fitting 90 and to use this information to initiate the harvest cycle. Note that since the water level used to initiate harvest is based on a fixed location (the bottom of the non-adjustable air fitting 90), it is not possible to adjust this water level.

Since the air pressure inside chamber 92 is brought to ambient air pressure each cycle by the water level dropping below that level—it is possible to re-calibrate or "zero" pressure sensor 84 to ambient pressure each cycle. In the software, when the water level drops below the air fitting 90 (as detected by the dramatic change in noise level), the pressure measured is set to be re-calibrated or equal to "zero". This can be done by setting the pressure reading to zero, or calculating an offset that can be applied to pressure readings during the ice-making process. This eliminates any drift that could be experienced by the air pressure sensor 84 itself. Such drift can result from imperfections in the sensor, changes in ambient pressure or temperature or even tiny air leaks in the system.

Because the water level reaching the bottom of the air fitting is used to initiate harvest, a different method is needed to terminate sump purging since this step results in the water level being even lower where the level cannot be detected. Since purge quantity is not as critical as the amount of water used to make the ice, it is possible to simply time the purge cycle to purge approximately the correct amount of water. Unlike cube thickness, the user will not know or care if the purge quantity isn't exact or consistent every cycle. Controlling the purge quantity using a timed function also makes it very easy to change how much water is purged each cycle, or to control when a purge cycle is performed. For example, it may be desirable to only purge the ice making water every third cycle to minimize water consumption. This can easily be accomplished through software.

Controlling the refilling of sump 70 with water after the harvest and purge cycles is done with air pressure data. Because filling happens relatively quickly, the pressure read by sensor 84 is not affected to any significant degree by changes in temperature or pressure or by sensor drift. Thus the measurement of water height will remain accurate during filling when done using air pressure. When the air pressure indicates that the water in the sump has reached the desired fill level, the inlet valve can be closed. Because the fill level is controlled by software, it can be easily changed. And since the water level at which harvest is initiated is fixed, the height of this higher fill level is what controls how thick the ice cubes will be. That is, if a higher fill level is used, the amount of water that will be frozen increases, making thicker ice cubes. Conversely, a lower fill level corresponds to less water being frozen and thinner ice cubes.

Figure 3:
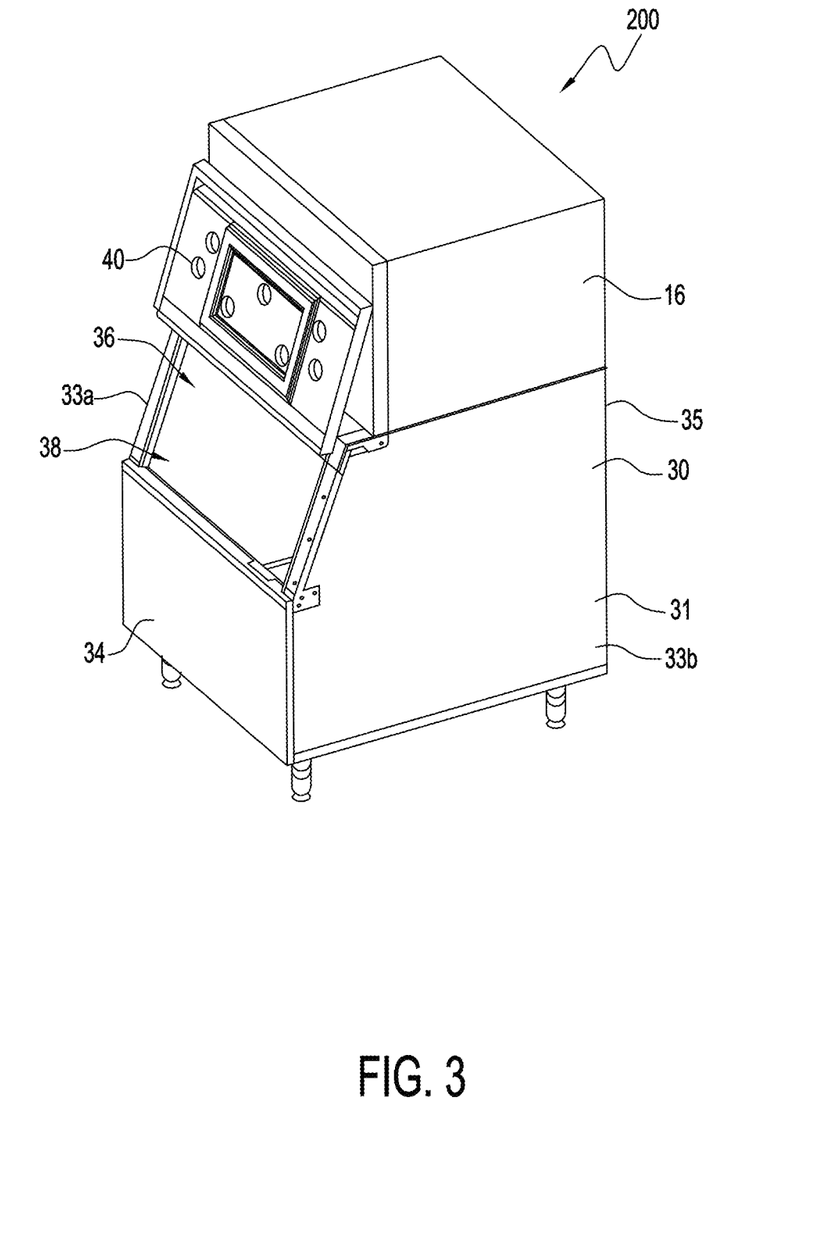
FIG. 3 is a right perspective view of an ice maker assembly with an ice maker disposed within a cabinet wherein the cabinet is disposed on an ice storage bin assembly according to one embodiment of the disclosure.

In many embodiments, as illustrated in FIG. 3, ice maker 10 may be disposed inside of a cabinet 16 which may be mounted on top of an ice storage bin assembly 30 forming an ice maker assembly 200. Cabinet 16 may be closed by suitable fixed and removable panels to provide temperature integrity and compartmental access, as will be understood by those skilled in the art. Ice storage bin assembly 30 includes an ice storage bin 31 having an ice hole 37 (see FIG. 4) through which ice produced by ice maker 10 falls. The ice is then stored in cavity 36 until retrieved. Ice storage bin 31 further includes an opening 38 which provides access to the cavity 36 and the ice stored therein. Cavity 36, ice hole 37 and opening 38 are formed by a left wall 33a, a right wall 33b, a front wall 34, a back wall 35 and a bottom wall (not shown). The walls of ice storage bin 31 may be thermally insulated with various insulating materials including, but not limited to, fiberglass insulation or open- or closed-cell foam comprised, for example, of polystyrene or polyurethane, etc. in order to retard the melting of the ice stored in ice storage bin 31. A door 40 can be opened to provide access to cavity 36.

Having described each of the individual components of embodiments of ice maker 10, the manner in which the components interact and operate may now be described. During operation of ice maker 10 in a cooling cycle, compressor 12 receives low-pressure, substantially gaseous refrigerant from evaporator assembly 20 through suction line 28, pressurizes the refrigerant, and discharges high-pressure, substantially gaseous refrigerant through discharge line 25 to condenser 14. In condenser 14, heat is removed from the refrigerant, causing the substantially gaseous refrigerant to condense into a substantially liquid refrigerant.

After exiting condenser 14, the high-pressure, substantially liquid refrigerant is routed through liquid line 27 to thermal expansion device 18, which reduces the pressure of the substantially liquid refrigerant for introduction into evaporator assembly 20. As the low-pressure expanded refrigerant is passed through tubing of evaporator assembly 20, the refrigerant absorbs heat from the tubes contained within evaporator assembly 20 and vaporizes as the refrigerant passes through the tubes. Low-pressure, substantially gaseous refrigerant is discharged from the outlet of evaporator assembly 20 through suction line 28, and is reintroduced into the inlet of compressor 12.

In certain embodiments, assuming that all the components are working properly, at the start of the cooling cycle, water inlet valve 52 may be turned on to supply water to sump 70. After the desired level of water is supplied to sump 70, the water inlet valve 52 may be closed. As previously discussed, the "desired" amount or level of water will depend on the amount of ice to be made and its thickness. Water pump 62 circulates the water from sump 70 to freeze plate 60 via water line 63 and distributor manifold or tube 66. Compressor 12 causes refrigerant to flow through the refrigeration system. The water that is supplied by water pump 62 then begins to cool as it contacts freeze plate 60, returns to water sump 70 below freeze plate 60 and is recirculated by water pump 62 to freeze plate 60. Once the water reaches 32 degrees F., water flowing across freeze plate 60 starts forming ice cubes. After the ice cubes are fully formed, hot gas valve 24 is opened allowing warm, high-pressure gas from compressor 12 to flow through hot gas bypass line 23 to enter evaporator assembly 20, thereby harvesting the ice by warming freeze plate 60 to melt the formed ice to a degree such that the ice may be released from freeze plate 60 and falls through hole 37 (see FIG. 4) into ice storage bin 31 where the ice can be temporarily stored and later retrieved. Hot gas valve 24 is then closed and the cooling cycle can repeat.

Various embodiments of ice maker 10 can determine the ability of ice maker 10 to refill sump 70 with water, thus indicating whether water inlet valve 52 is supplying the desired amount of water for making ice. Specifically, if during the refilling portion of the cooling cycle, which occurs after the ice has released from the freeze plate and the water pump has turned back ON, the water level (x) in sump 70 does not increase, then controller 80 can determine that the supply of water to ice maker 10 has failed. This failure mode could be the result of a failure of the water supply or a failure of water inlet valve 52. In certain embodiments, display 104 and/or the alarm may indicate that such a failure mode has been detected. For example, the indication may be a message, an indicator light, and/or a sound specific to the detected failure mode. Controller 80 may optionally shut off ice maker 10. Likewise, various embodiments of ice maker 10 can detect if water inlet valve 52 has failed in the OPEN position. This may be detected by controller 80 if the water level (x) in sump 70 continues to rise after controller 80 has attempted to CLOSE water inlet valve 52. In certain embodiments, display 104 and/or the alarm may indicate that such a failure mode has been detected. For example, the indication may be a message, an indicator light, and/or a sound specific to the detected failure mode. Controller 80 may optionally shut off ice maker 10.

In normal operating conditions, when water pump 62 is turned ON, the water level (x) in sump 70 will drop as water is removed from sump 70 by water pump 62 and moved through water line 63 and across freeze plate 60 of ice maker 10. Thus, by monitoring the water level (x) when water pump 62 is turned ON, it is possible to determine if water pump 62 is functioning properly. If the water level (x) does not drop during the several seconds following water pump 62 being turned on, then controller 80 may detect a failure mode of water pump 62 and can take the appropriate actions. In certain embodiments, display 104 and/or the alarm may indicate that such a failure mode has been detected. For example, the indication may be a message, an indicator light, and/or a sound specific to the detected failure mode. Controller 80 may optionally shut off ice maker 10.

Figure 6A:
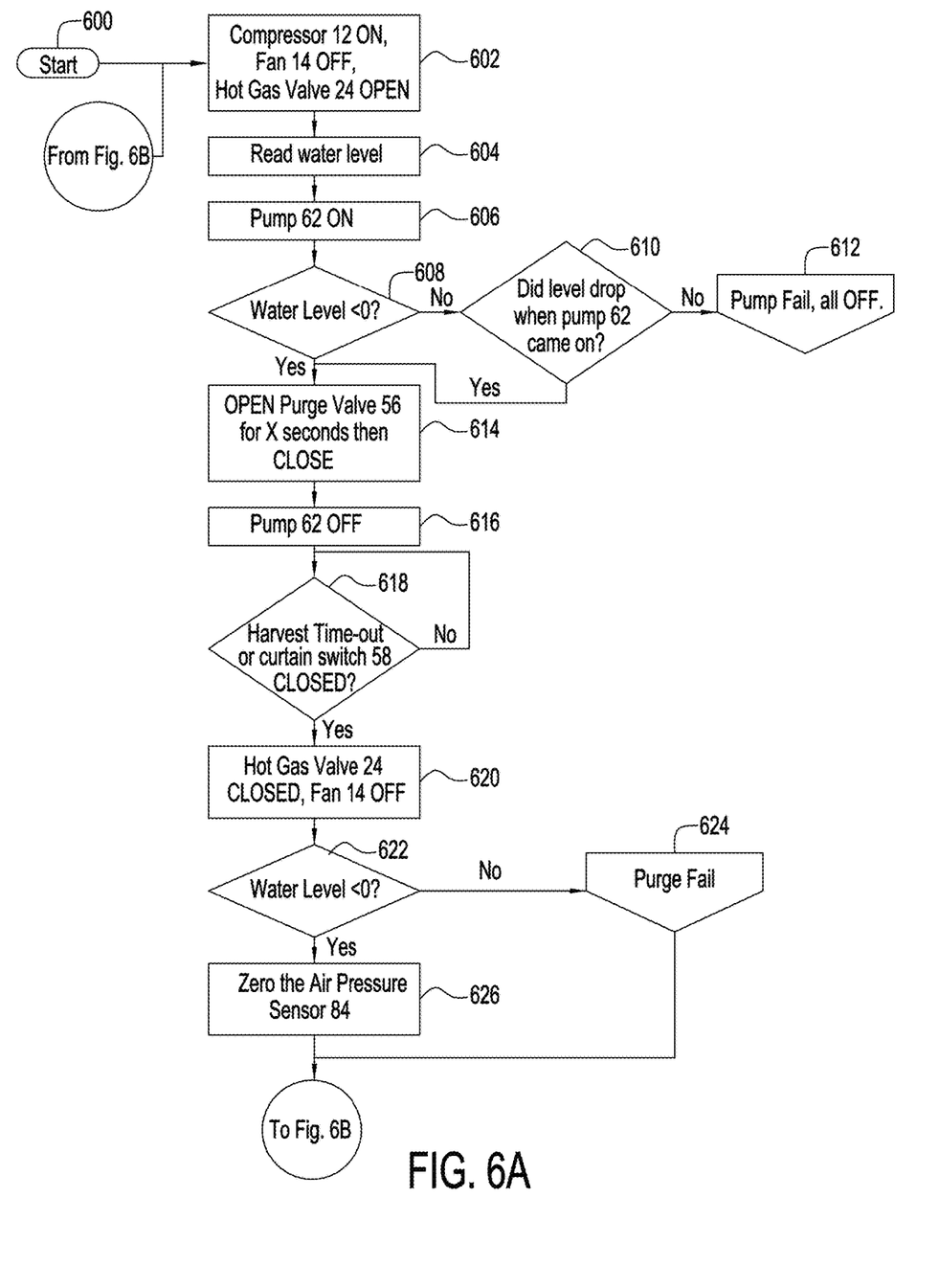
FIG. 6A is flow chart describing the operation of an ice maker according to one embodiment of the disclosure.

Referring now to FIGS. 6A-6D, a method of operation of certain embodiments of ice maker 10 is described in detail. In FIG. 6A, at step 600 the method starts and at step 602, controller 80 turns ON compressor 12, turns OFF fan 14 (at startup, fan 14 is already OFF) and OPENS hot gas valve 24 to begin a harvest cycle. At step 604, controller 80 reads the water level using air pressure sensor 84. After the water level is read, pump 62 is turned ON at step 606.

At step 608, controller 80 determines if the if the water level read at step 604 is above or below the bottom of air fitting 90 as evidenced by the level of noise in the air pressure data from air pressure sensor 84. A lower level of noise in the data indicates that the water level is lower than air fitting 90 (corresponding to the ambient air pressure and lower noise level) and a higher level of noise indicates that the water level is above the bottom of air fitting 90. If the water level is below air fitting 90, the process skips to step 614. If the water level is above air fitting 90, then it is possible to detect if pump 62 is working and the process moves to step 610. If the water level dropped as a result of turning pump 62 ON, then pump 62 is working and the process moves to step 614. If the water level didn't drop when pump 62 was turned ON, then pump 62 isn't working and controller 80 moves to step 612 and the machine is turned OFF since the ice machine cannot function without a working pump 62. More steps may be added after step 612 to alert the operator of a failure and/or to keep trying to restart the pump.

Assuming pump 62 is working, the process continues at step 614. At this step the sump 70 is purged by the system turning ON purge valve 56 for X seconds. The value of X is set so that it is sufficient time to empty the sump to the desired amount and could be electronically adjustable. X could be set anywhere from 0 seconds to as long as it takes to completely empty sump 70 (for example 60 seconds). When X seconds have elapsed and the sump has emptied the desired amount, the controller moves to step 616 and pump 62 is turned OFF.

At step 618 the controller waits until either curtain switch 58 CLOSES indicating the ice has been harvested or the harvest timer reaches its maximum amount (e.g., 3 min-5 min.). This indicates that the harvest portion of the cycle is complete and the water level is below air fitting 90. The controller then moves to step 620 and CLOSES hot gas valve 24 and turns fan 14 ON.

At step 622 controller 80 checks to make sure the water level is below air fitting 90—since it should be at this point if it purged as expected. If it isn't, this means that there has been a purge failure and controller 80 moves to step 624. Since ice machine 10 can make ice in spite of a purge failure, the system continues on to step 628 (shown in FIG. 6B). Note that other steps may be taken at step 624 including notifying the operator, stopping the machine or performing other tests to make sure the purge system is working.

If the water level was below air fitting 90 at step 622, the controller moves to step 626 and re-calibrates air sensor 84, that is, it sets the water level to zero at this measured air pressure.

Figure 6B:
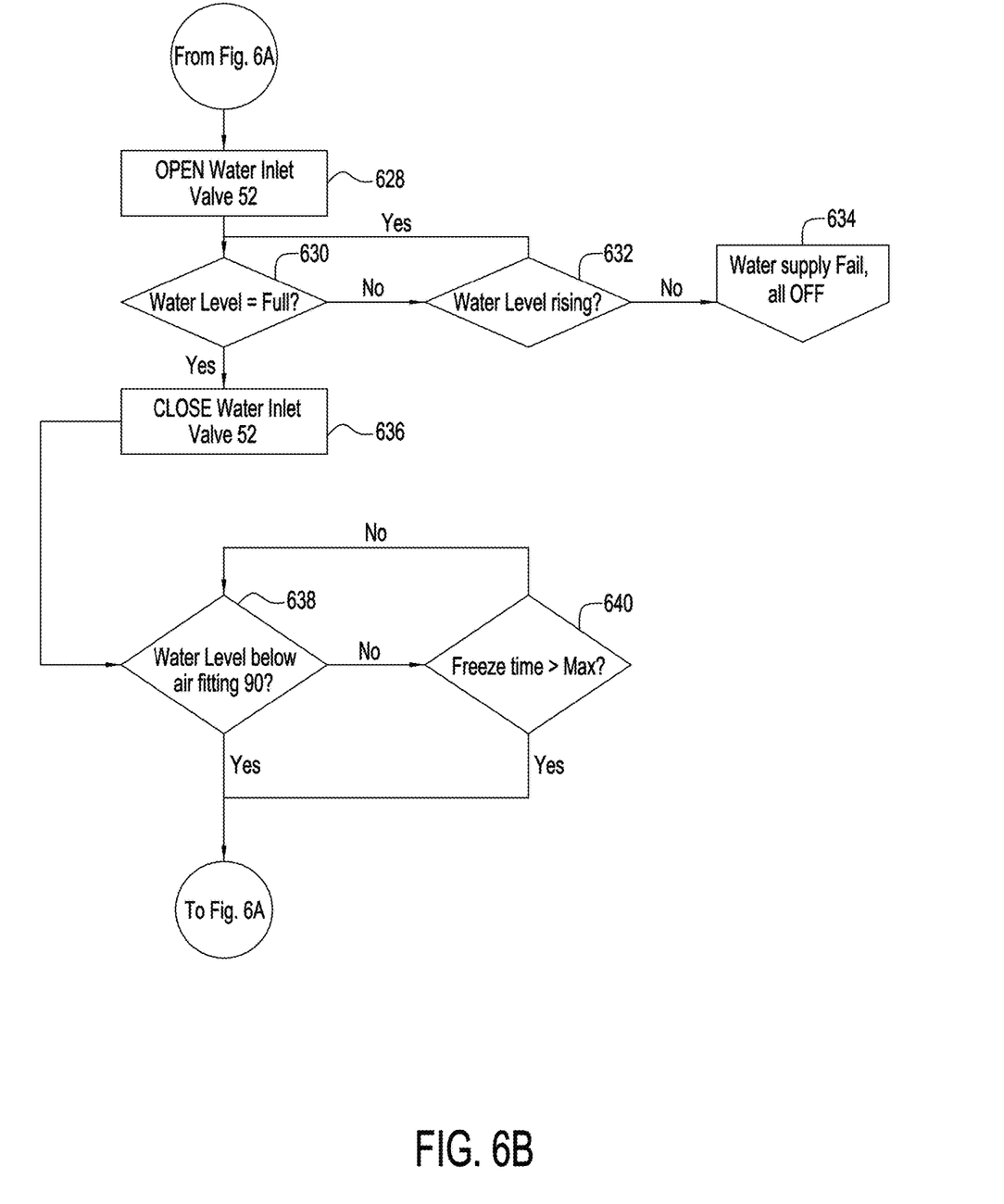
FIG. 6B is flow chart describing the operation of an ice maker according to one embodiment of the disclosure.

The next step 628 is shown in FIG. 6B. In step 628 water inlet valve 52 is opened to begin refilling sump 70. As indicated in step 630, inlet valve 52 should stay open until the water level, as detected by the air pressure sensor 84, reaches its "full" level. During filling the air pressure sensor 84 monitors the water level, checking it in step 632 to make sure that level is rising. If it's not rising, the system stops in step 634 because the water supply has failed. Note that step 634 may include other steps such as notifying the operator of the failure and continuing to test the water supply and restarting the machine if the water supply is restored.

Once the water level reaches the "full" level, the inlet valve 52 is CLOSED in step 636. As noted earlier, the height of the "full" level controls the thickness of the ice cubes produces.

At this point ice machine 10 is waiting for the water level to drop below the bottom of air fitting 90 indicating that the ice cubes are fully formed, and the freeze cycle is complete. This level is again detected by checking the air pressure data noise level. Once the data noise level drops to the lower level, the system knows that the water level has just dropped below the air fitting 90. Step 638 checks for this. In step 640 the system checks to see if the maximum allowed freeze time has been reached. If either of these things is true, the freeze is complete, and the machine goes back to harvest at step 602.

While various steps are described herein in one order, it will be understood that other embodiments of the method can be carried out in any order and/or without all of the described steps without departing from the scope of the disclosure.

Thus, there has been shown and described novel methods and apparatuses of an ice maker having a controller adapted to measure the water level in a sump and to detect various failure modes, which overcome many of the problems of the prior art set forth above. It will be apparent, however, to those familiar in the art, that many changes, variations, modifications, and other uses and applications for the subject devices and methods are possible. All such changes, variations, modifications, and other uses and applications that do not depart from the spirit and scope of the disclosure are deemed to be covered by the disclosure which is limited only by the claims which follow.

What is claimed is:

1. An ice maker for forming ice, the ice maker comprising:
   an evaporator;
   a water pump for supplying water to a surface of the evaporator, so that water on the surface of the evaporator forms ice;
   a sump below the freeze plate to hold water that passes over the evaporator surface;
   an air fitting in the sump, the air fitting defining a chamber, wherein air is in the chamber, wherein the air fitting comprises one or more openings through which water in the sump is in fluid communication with the air in the chamber;
   a pneumatic tube having a proximal end and a distal end, wherein the air inside the distal end is in fluid communication with the chamber of the air fitting; and
   a controller comprising a processor and an air pressure sensor, wherein the air inside the proximal end of the pneumatic tube is in fluid communication with the air pressure sensor,
   wherein the air pressure sensor is configured to measure an air pressure from the air chamber of the air fitting, and the air pressure has a noise level of data associated therewith,
   wherein the air pressure corresponds to a water level in the sump,
   wherein when the water level is below the air fitting, the noise level of the data associated with the air pressure is lower than the noise level of data associated with the air pressure when the water level is at or higher than the bottom of the air fitting, and
   wherein the controller is configured to initiate a harvest cycle when the water level drops below the bottom of the air fitting as indicated by the noise level of data associated with the air pressure, wherein during the harvest cycle the ice is removed from the surface of the evaporator.

2. The ice maker of claim 1, wherein the amount of water frozen onto the surface of the evaporator is equivalent to the water contained in the sump between a full level of water in the sump and the level of the water when it is at the bottom of the air fitting.

3. The ice maker of claim 1, wherein the thickness of the ice can be electronically-adjusted by the controller.

4. The ice maker of claim 1, further comprising a purge valve in communication with the controller, and wherein the controller is configured to control a portion of the water in the ice maker to be purged through the purge valve for a set period of time.

5. The ice maker of claim 1, wherein there is no thickness sensor to measure the thickness of the ice on the surface of the evaporator that is in contact with the surface or the ice.

6. The ice maker of claim 1, wherein the noise level of data associated with the air pressure when the water level is at or above the bottom of the air fitting is higher than the noise level of data associated the air pressure when the water level is below the bottom of the air fitting by a factor of five to 100.

7. A method of controlling an ice maker, the ice maker comprising:
an evaporator;
a water pump for supplying water to a surface of the evaporator, so that water on the surface of the evaporator forms ice;
a sump below the freeze plate adapted to hold water that passes over the evaporator surface;
an air fitting in the sump, the air fitting defining a chamber, wherein air is in the chamber, wherein the air fitting comprises one or more openings through which water in the sump is in fluid communication with the air in the chamber;
a pneumatic tube having a proximal end and a distal end, wherein the air inside the distal end is in fluid communication with the chamber of the air fitting; and
a controller comprising a processor and an air pressure sensor, wherein the air inside the proximal end of the pneumatic tube is in fluid communication with the air pressure sensor,
wherein the air pressure sensor measures an air pressure from the air chamber of the air fitting, and the air pressure has a noise level of data associated therewith,
wherein the air pressure corresponds to a water level in the sump,
the method comprising the steps of:
sensing the noise level of data associated with the air pressure measured by the air pressure sensor; and
using that data to determine if the water level is above or below the bottom of the air fitting, wherein a higher noise level corresponds to the water level being above the bottom of the air fitting and a lower noise level corresponds the water level being below the bottom of the air fitting.

8. The method of claim 7, further comprising the step of, after the using step:
initiating a harvest cycle if the water level is below the bottom of the air fitting, wherein during the harvest cycle ice is removed from the surface of the evaporator.

9. The method of claim 8, wherein the ice maker further comprises a purge valve and the method further comprises the steps of:
opening the purge valve when the water level has passed below the bottom of the air fitting, so that a portion of the water in the ice maker passes through the purge valve; and
keeping the purge valve open for a previously determined period of time to control the amount of water purged.

10. The method of claim 7, further comprising the step of:
performing a recalibration or zeroing of the air pressure sensor each time the water level drops below the bottom of the air chamber.

11. The method of claim 7, wherein the amount of water frozen onto the surface of the evaporator is equivalent to the water contained in the sump between a full level of water in the sump and the level of the water when it is at the bottom of the air fitting, and the thickness of the ice can be electronically-adjusted by the controller, the method further comprising the step of:
using the height of the electronically-adjustable full water level to control the thickness of the resulting ice formed on the surface of the evaporator.

* * * * *